(12) United States Patent
Niikura et al.

(10) Patent No.: US 10,942,607 B2
(45) Date of Patent: Mar. 9, 2021

(54) MANIPULATION DETECTION DEVICE AND VIDEO DISPLAY SYSTEM THAT ARE CAPABLE DETECTING AN OBJECT ON A VIDEO DISPLAY SURFACE

(71) Applicant: MAXELL, LTD., Kyoto (JP)

(72) Inventors: Takehiro Niikura, Tokyo (JP); Takashi Matsubara, Tokyo (JP); Naoki Mori, Tokyo (JP)

(73) Assignee: MAXELL, LTD., Kyoto (JP)

( * ) Notice: Subject to any disclaimer, the term of this patent is extended or adjusted under 35 U.S.C. 154(b) by 242 days.

(21) Appl. No.: 15/775,357

(22) PCT Filed: Nov. 13, 2015

(86) PCT No.: PCT/JP2015/081922
§ 371 (c)(1),
(2) Date: May 10, 2018

(87) PCT Pub. No.: WO2017/081805
PCT Pub. Date: May 18, 2017

(65) Prior Publication Data
US 2020/0174620 A1    Jun. 4, 2020

(51) Int. Cl.
*G06F 3/042* (2006.01)
*G06F 3/03* (2006.01)
(Continued)

(52) U.S. Cl.
CPC .......... *G06F 3/0425* (2013.01); *G06F 3/0304* (2013.01); *G06F 3/03542* (2013.01); *G06F 3/0416* (2013.01)

(58) Field of Classification Search
CPC . G06F 2203/04101; G06F 2203/04808; G06F 3/0416; G06F 3/0425; G06F 3/04883; G06K 9/00355; G06K 9/2036
See application file for complete search history.

(56) References Cited

U.S. PATENT DOCUMENTS

2001/0030668 A1    10/2001 Erten et al.
2008/0166022 A1    7/2008 Hildreth
(Continued)

FOREIGN PATENT DOCUMENTS

JP    2010-112990 A    5/2010
JP    2010-257089 A    11/2010
(Continued)

OTHER PUBLICATIONS

International Search Report dated Feb. 2, 2016 issued in International Patent Application No. PCT/JP2015/081922 (with English translation).

*Primary Examiner* — Chun-Nan Lin
(74) *Attorney, Agent, or Firm* — McDermott Will & Emery LLP

(57) ABSTRACT

A manipulation detection device includes a first manipulation detection process based on detection of light emission of an electronic pen (a first manipulation object) and a second manipulation detection process based on detection of a shadow of a finger (a second manipulation object) by radiation of illumination light. An image sensor captures an image of the electronic pen and an image of the finger, and image signal processing units perform a contrast adjustment of the captured image. Here, a state of the contrast adjustment performed by the image signal processing unit differs between the captured image of the electronic pen and the captured image of the finger. Manipulation detecting units execute a manipulation detection process for the electronic pen and the finger using the captured image which has undergone the contrast adjustment.

7 Claims, 15 Drawing Sheets

(51) Int. Cl.
    *G06F 3/0354*     (2013.01)
    *G06F 3/041*      (2006.01)

(56)          References Cited

U.S. PATENT DOCUMENTS

| | | | |
|---|---|---|---|
| 2012/0098746 A1 | 4/2012 | Ogawa | |
| 2013/0069870 A1 | 3/2013 | Ichieda | |
| 2014/0145948 A1* | 5/2014 | Hong | G06F 3/038 |
| | | | 345/158 |
| 2014/0181745 A1* | 6/2014 | Cui | H04N 5/23216 |
| | | | 715/835 |
| 2014/0313165 A1* | 10/2014 | Lam | G06F 3/0428 |
| | | | 345/175 |
| 2016/0253043 A1 | 9/2016 | Narikawa et al. | |
| 2017/0278483 A1* | 9/2017 | Miyazawa | G09G 3/20 |

FOREIGN PATENT DOCUMENTS

| | | |
|---|---|---|
| JP | 2012-068690 A | 4/2012 |
| JP | 2013-064917 A | 4/2013 |
| JP | 2013-141105 A | 7/2013 |
| WO | 2015/052765 A1 | 4/2015 |

\* cited by examiner

FIG. 3
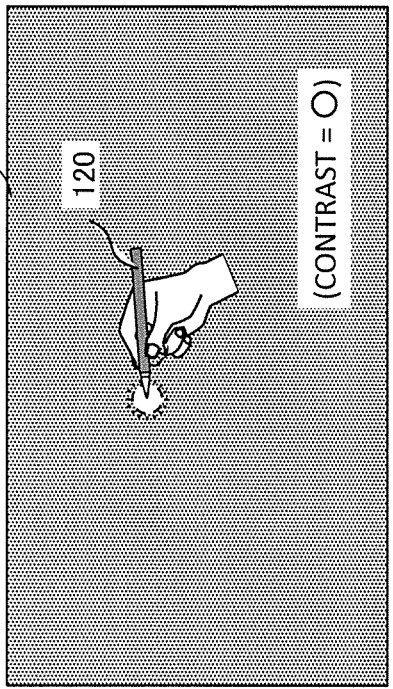
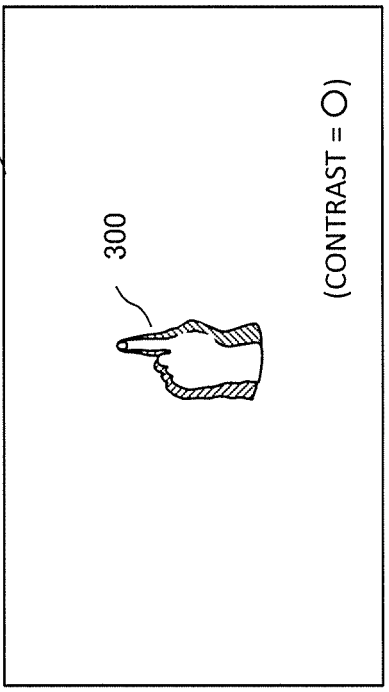
(1) CASE IN WHICH CAPTURED IMAGE IS BRIGHT
(2) CASE IN WHICH CAPTURED IMAGE IS DARK
(a) MANIPULATION BY ELECTRONIC PEN
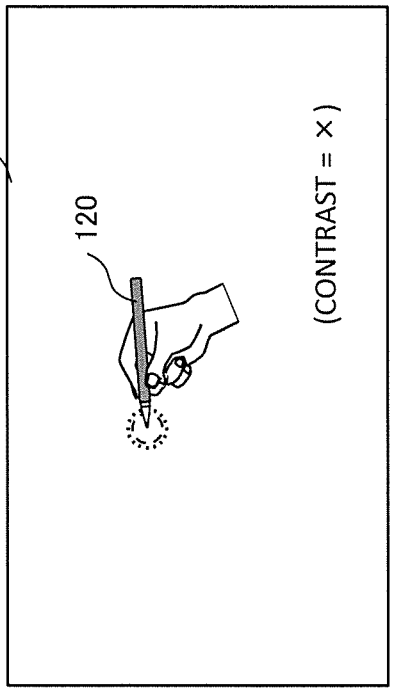
(b) MANIPULATION BY FINGER FIG. 4
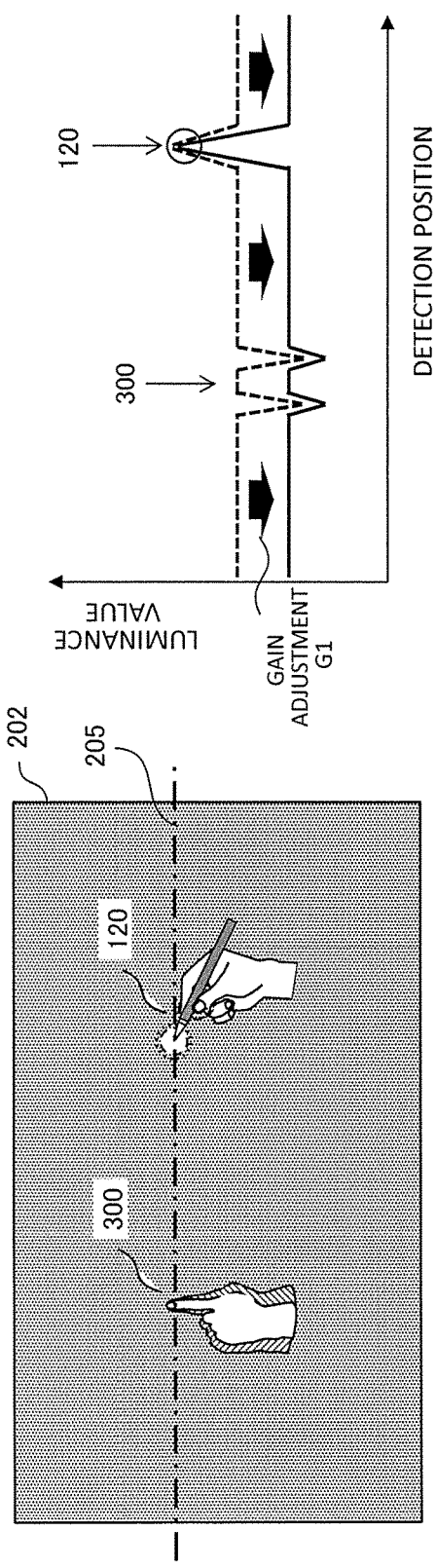
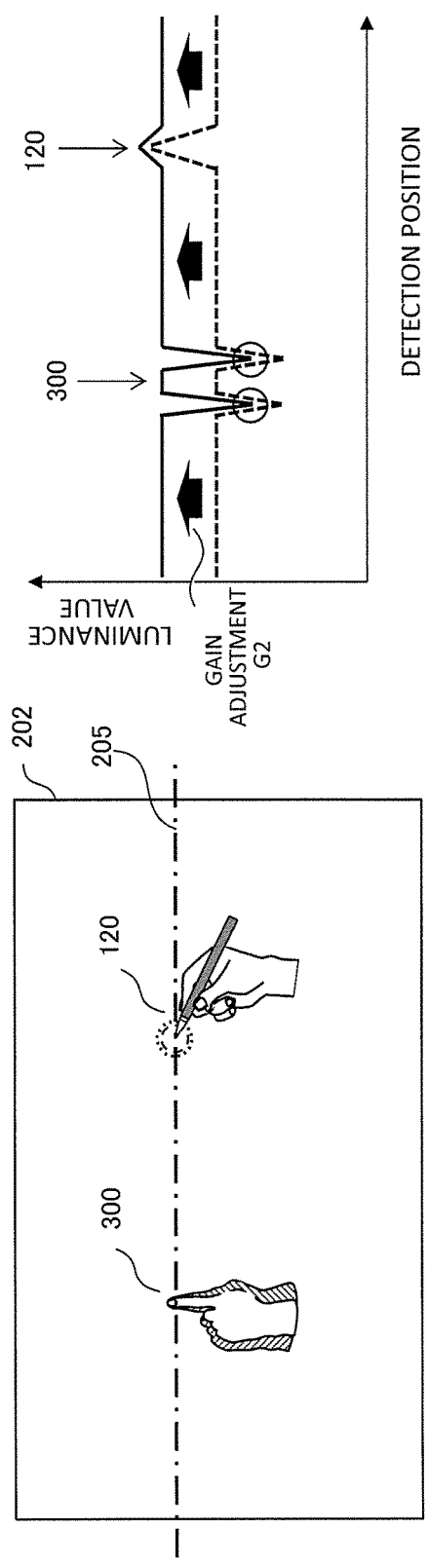

FIG. 7
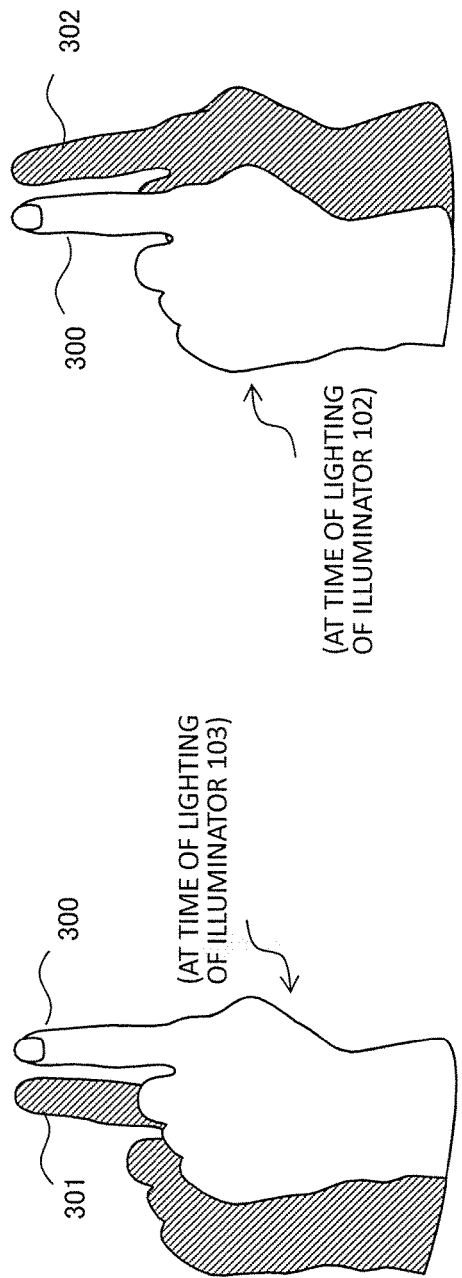
(a) SHADOW AT TIME OF NON-CONTACT / FRONT VIEW
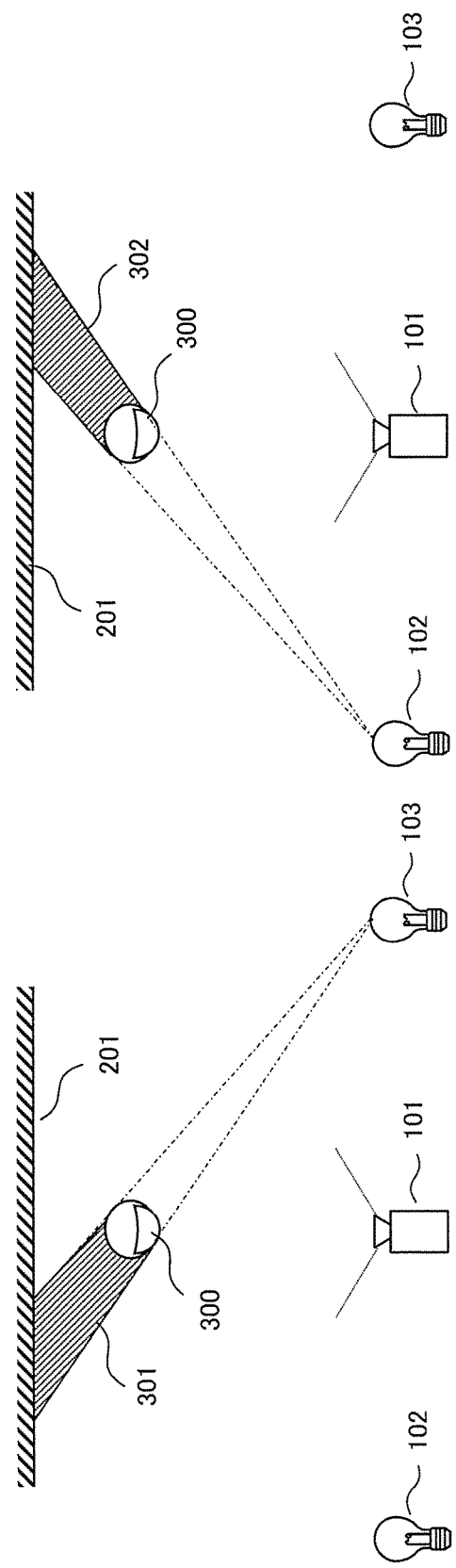
(b) SHADOW AT TIME OF NON-CONTACT / TOP VIEW FIG. 8
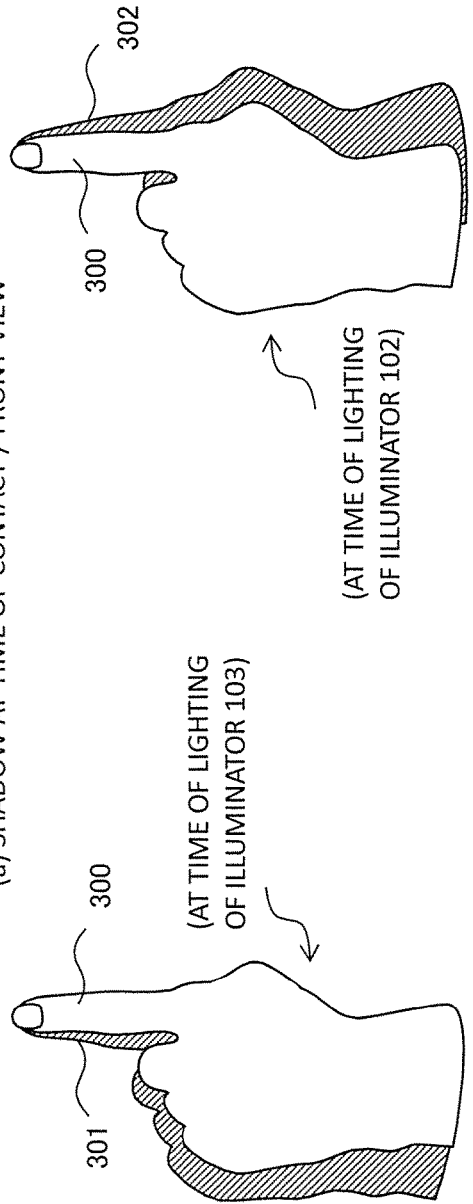
(a) SHADOW AT TIME OF CONTACT / FRONT VIEW
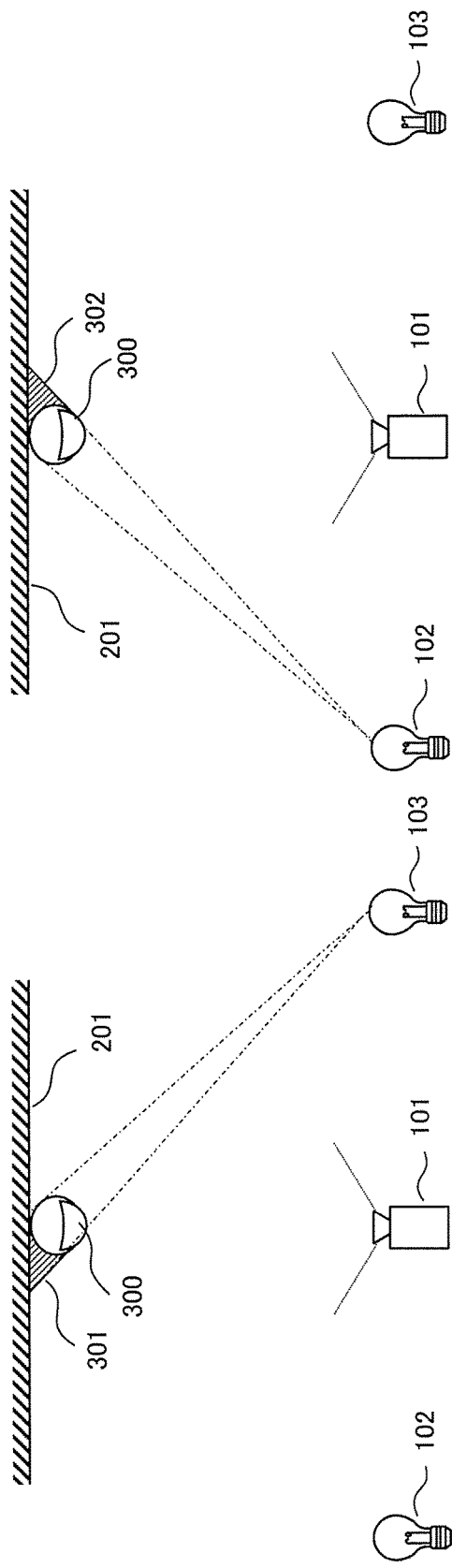
(b) SHADOW AT TIME OF CONTACT / TOP VIEW

MANIPULATION DETECTION DEVICE AND VIDEO DISPLAY SYSTEM THAT ARE CAPABLE DETECTING AN OBJECT ON A VIDEO DISPLAY SURFACE

CROSS REFERENCE

This patent application is the U.S. National Phase under 35 U.S.C. § 371 of International Application No, PCT/W2015/081922, filed on Nov. 13, 2015, the entire contents are hereby incorporated by reference.

TECHNICAL FIELD

The present invention relates to a manipulation detection device, a manipulation detection method, and a video display system using the same, which are capable of detecting a manipulation performed by a user on a video display surface.

BACKGROUND ART

In order to detect a manipulation performed by a user using a video display surface as a manipulation surface, a method in which a user performs a manipulation using an electronic pen or the like, and a manipulation position is detected from a light emission position of the electronic pen is known. Further, a method of detecting a position of a finger or a hand of a user from a shadow thereof is known. A manipulation detection device which is capable of coping with both a case in which a manipulation object manipulated by a user is an electronic pen and a case in which the manipulation object is a finger or a hand of the user is disclosed in Patent Document 1. In other words, the manipulation detection device disclosed in Patent Document 1 includes a first detecting unit which performs a first detection process of detecting a position at which a first manipulation object having a leading end emitting light comes into contact with a manipulation surface and a second detecting unit which irradiates the manipulation surface with illumination light and performs a second detection process of detecting a position at which a second manipulation object not emitting light comes into contact with the manipulation surface, the second detection process being different from the first detection process.

CITATION LIST

Patent Document

Patent Document 1: WO 2015/052765 A

SUMMARY OF THE INVENTION

Problems to be Solved by the Invention

In the detection device disclosed in Patent Document 1, there are cases in which the process of detecting both the first manipulation object having a leading end emitting light and the second manipulation object not emitting light from one image captured by an imaging unit is performed. However, it is difficult to capture an image of the first manipulation object and an image of the second manipulation object so that the contrasts of both images are satisfied under the same imaging condition. In other words, if an image in which the whole screen is dark is captured in order to detect the first manipulation object emitting light, the contrast of the second manipulation object not emitting light decreases, and the detection accuracy in the second detecting unit deteriorates. On the other hand, if the entire image is captured as a bright image in order to detect the second manipulation object not emitting light, the contrast of the first manipulation object emitting light decreases, and the detection accuracy in the first detecting unit deteriorates.

It is an object of the present invention to implement the image contrast suitable for detection of each manipulation object in a case in which a light-emitting manipulation object and a non-light emitting manipulation object are imaged under the same imaging condition.

Solutions to Problems

The present invention provides a manipulation detection device that performs a first manipulation detection process based on detection of light emission or reflected light of a first manipulation object and a second manipulation detection process based on detection of a shadow of a second manipulation object by radiation of illumination light, including: an imaging unit that captures an image of the first manipulation object and an image of the second manipulation object; an image signal processing unit that performs a contrast adjustment of a captured image captured by the imaging unit or a contrast adjustment when imaging is performed by the imaging unit; and a manipulation detecting unit that executes the first manipulation detection process and the second manipulation detection process using a captured image which has undergone the contrast adjustment, wherein a state of the contrast adjustment performed by the image signal processing unit differs between a captured image used in the first manipulation detection process and a captured image used in the second manipulation detection process.

Effects of the Invention

According to the present invention, the image contrast suitable for manipulation detection of each of a first manipulation object and a second manipulation object is implemented, the detection accuracy is improved, and the manipulation performance is improved.

BRIEF DESCRIPTION OF THE DRAWINGS

FIG. 3 is a diagram illustrating a relation between brightness of a captured image and manipulation detection accuracy.

FIG. 4 is a diagram for describing luminance adjustment and a contrast change by first and second image signal processing units.

FIG. 7 is a diagram illustrating a shape of a shadow in a case in which a finger is not in contact with a wall surface.

FIG. 8 is a diagram illustrating a shape of a shadow in a case in which a finger is in contact with a wall surface.

MODE FOR CARRYING OUT THE INVENTION

Hereinafter, exemplary embodiment will be described with reference to the appended drawings. In the following embodiments, manipulation detection in a case in which both a light emitting manipulation object (a first manipulation object) such as an electronic pen and a non-light emitting manipulation object (a second manipulation object) such as a finger or a hand of a user will be described. The first manipulation object may be a manipulation object which emits reflected light without emitting light by itself, and in the following description, such a manipulation object is assumed to be included in the first manipulation object.

First Embodiment

In a first embodiment, a method of detecting a contact point between both manipulation objects (a manipulation position) using a first image signal processing unit common to first and second manipulation objects and a second image signal processing unit for the second manipulation object not emitting light will be described.

Figure 1:
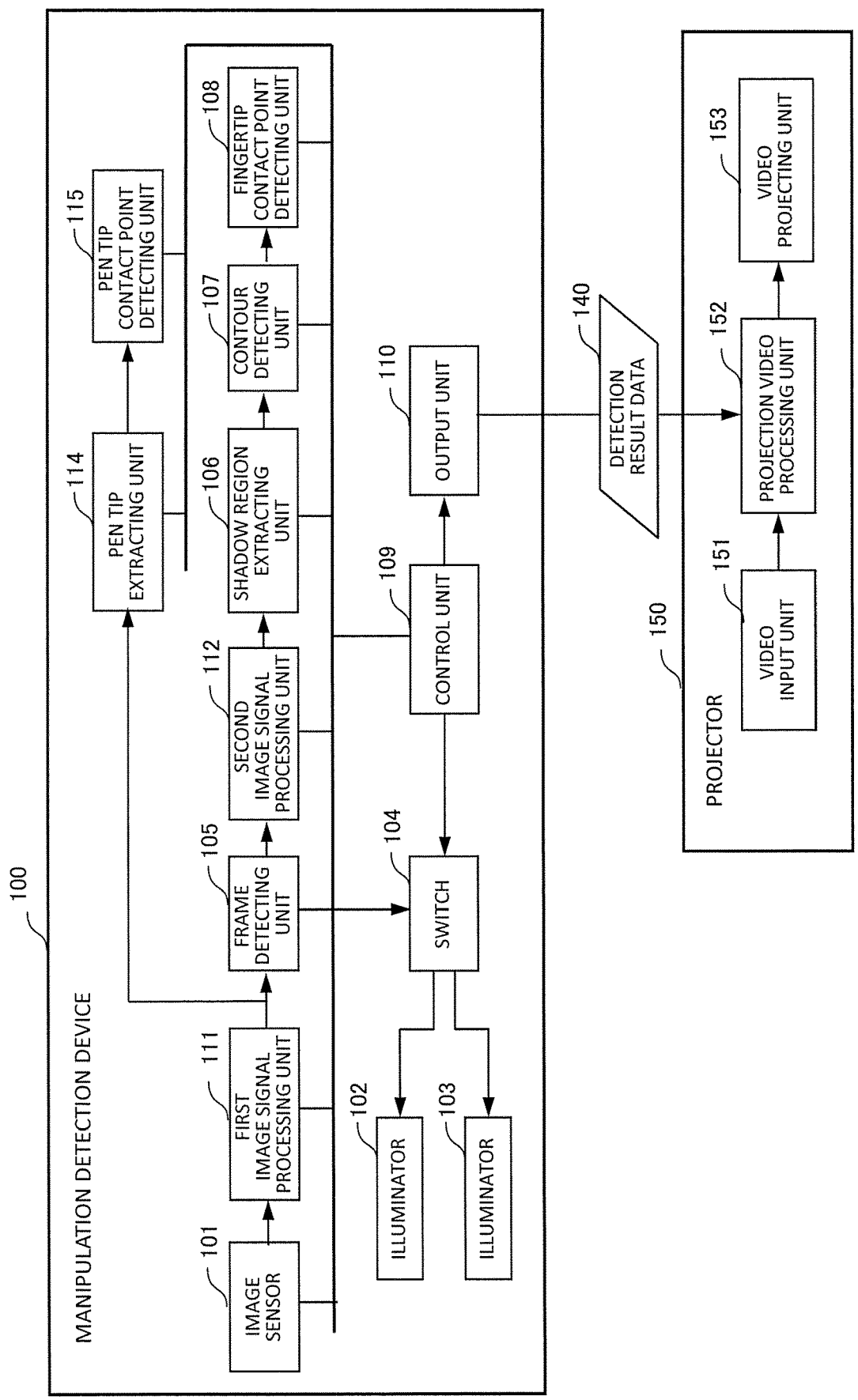
FIG. 1 is a configuration diagram of a video display system using a manipulation detection device in a first embodiment.

FIG. 1 is a diagram illustrating a configuration of a video display system using a manipulation detection device in the first embodiment. The video display system includes a manipulation detection device 100 and a projector 150 and has a configuration of controlling a video projected by the projector 150 on the basis of a manipulation of a user detected by the manipulation detection device 100.

In the manipulation detection device 100, 101 indicates an image sensor (an imaging unit), 102 and 103 indicate illuminators, 104 indicates a switch, 105 indicates a frame detecting unit, 106 indicates a shadow region extracting unit, 107 indicates a contour detecting unit, 108 indicates a fingertip contact point detecting unit, 109 indicates a control unit, 110 indicates an output unit, 111 indicates a first image signal processing unit, 112 indicates a second image signal processing unit, 114 indicates a pen tip extracting unit, and 115 indicates a pen tip contact point detecting unit.

The image sensor (imaging unit) 101 includes a sensor circuit, a lens, and the like and acquires an image of the first manipulation object (electronic pen) and an image of the second manipulation object (a finger or a hand of the user). Each of the illuminator 102 and the illuminator 103 includes a light emitting diode, a circuit board, a lens, and the like and irradiate a region to be imaged by the image sensor 101 with light. Accordingly, a shadow of the second manipulation object is formed. Further, the image sensor 101 may be constituted by an infrared camera, each of the illuminators 102 and 103 may be constituted by an infrared illuminator, and an infrared image may be captured to perform a process of detecting a state of the finger or the hand to be described later. Further, a light source of each of the illuminators 102 and 103 may be a light source such as a laser other than a light emitting diode.

The switch 104 is constituted by hardware, software, or the like, and performs control such that the illuminator 102 and the illuminator 103 are lighted up or off on the basis of a signal transferred from the frame detecting unit 105. Accordingly, the contrast of the shadow of the second manipulation object extracted from the captured image is improved in the shadow region extracting unit 106 to be described later. For example, in a case in which a signal A is transferred from the frame detecting unit 105, the illuminator 102 is lighted up, and the illuminator 103 is lighted off, and in a case in which a signal B is transferred from the frame detecting unit 105, the illuminator 102 is lighted off, and the illuminator 103 is lighted up.

The frame detecting unit 105 is constituted by hardware, software, or the like, and detects that imaging of one frame is completed by the image sensor 101 and transmits a signal to the switch 104 with a preset period. For example, in a case in which the number of images captured by the image sensor 101 is a multiple of 2, switching is performed such that the signals A and B are alternately transmitted to the switch 104. The cycle of switching the signal in the frame detecting unit 105 may be another cycle.

The first image signal processing unit 111 is constituted by a circuit board, software, or the like, and performs image processing on the captured image acquired by the image sensor 101 so that the entire image becomes dark, improves the contrast of a pen tip region of the first manipulation object (electronic pen), and facilitate extraction of a light emitting region of the pen tip in the pen tip extracting unit 114. In this case, the contrast of the pen tip region is improved by applying, for example, image processing such as gain adjustment and gamma adjustment.

The pen tip extracting unit 114 is constituted by hardware, software, or the like and extracts the light emitting region of the electronic pen emitting light from the image processed by the first image signal processing unit 111. For example, a region of a certain luminance value or more is extracted from the image which has undergone the gain adjustment. The process of the pen tip extracting unit 114 may be performed using other image processing algorithms for obtaining a similar result. The pen tip contact point detecting unit 115 is constituted by hardware, software, or the like and detects the contact point of the electronic pen with respect to the manipulation surface on the basis of a shape, a size, or the like of the light emitting region obtained by the pen tip extracting unit 114.

On the other hand, the second image signal processing unit 112 is constituted by a circuit board, software, or the like, and performs image processing on each pixel of the image output from the first image signal processing unit 111 so that the entire image becomes brighter and facilitates extraction of the shadow region of the second manipulation object (the finger or the hand) in the shadow region extracting unit 106. Here, the contrast of the shadow region is improved by applying, for example, image processing such as gain adjustment and gamma adjustment.

The shadow region extracting unit 106 is constituted by hardware, software, or the like and detects the shadow region from the image processed by the second image signal processing unit 112. For example, the region of the shadow is obtained by generating a difference image from a difference between a previously captured background image and the latest captured image and binarizing the difference image using a threshold value of a predetermined luminance. The process of the shadow region extracting unit 106 may be performed using other image processing algorithms for obtaining a similar result.

The contour detecting unit 107 is constituted by hardware, software, or the like and detects the contour of the shadow region obtained by the shadow region extracting unit 106. For example, the contour of the shadow region is obtained by initially obtaining a pixel at an upper left end of the shadow region and sequentially searching for neighbor pixels. The process of the contour detecting unit 107 may be performed using other image processing algorithms for obtaining a similar result. The fingertip contact point detecting unit 108 is constituted by a circuit board, software, or the like and detects the contact point of the finger with respect to the manipulation surface on the basis of the shape or the position of the shadow.

The control unit 109 is constituted by a circuit board, software, or the like, and controls the image sensor 101, the illuminators 102 and 103, the switch 104, the frame detecting unit 105, the shadow region extracting unit 106, the contour detecting unit 107, the fingertip contact point detecting unit 108, the output unit 110, the first image signal processing unit 111, the second image signal processing unit 112, the pen tip extracting unit 114, and the pen tip contact point detecting unit 115.

The output unit 110 is constituted by a network connection, a USB connection, an ultrasonic unit, an infrared communication device, or the like, and serves as an interface which can communicate with the projector 150 which displays a video to be projected. As a device for displaying a video, other displays (such as a head mounted display or a head up display) may be connected.

Detection result data 140 is data transmitted from the manipulation detection device 100 to the projector 150 via the output unit 110, and includes contact state information, contact point coordinates, and the like.

The projector 150 is a device that projects a video onto a projection surface such as a screen. The video input unit 151 receives a video signal to be projected, the projection video processing unit 152 performs a video signal conversion and correction process in accordance with a projection scheme, and the video projecting unit 153 converts the video signal into projection video light and projects the projection video light on the projection surface. For example, light modulation by a liquid crystal panel, a scanning scheme of laser light, or the like is used. Here, the projection video processing unit 152 performs various controls such as switching of a video to be projected from the video projecting unit 153, a display format change, and the like on the basis of the detection result data 140 received from the manipulation detection device 100.

Figure 2:
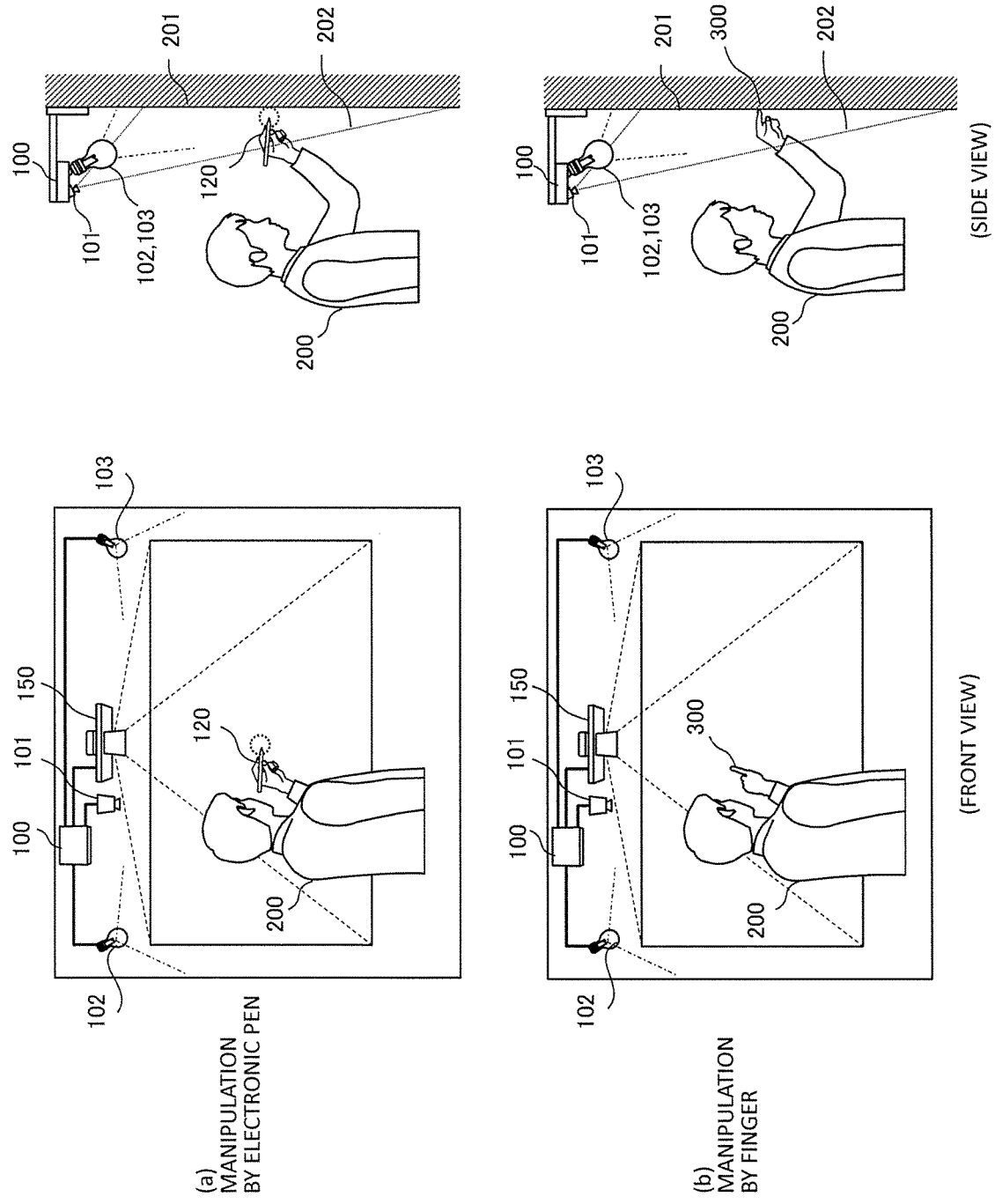
FIG. 2 is a diagram illustrating an external appearance of a manipulation detection device and a manipulation state of a user.

FIG. 2 is a front view and a side view illustrating an external appearance of the manipulation detection device 100 and the manipulation state of a user 200. FIG. 2(a) illustrates a case in which the user 200 performs a manipulation using an electronic pen 120 (the first manipulation object), and FIG. 2(b) illustrates a case in which the user performs a manipulation on a wall surface 201 with a finger 300 (the second manipulation object). The projector 150 projects a video onto the wall surface 201 (the projector 150 is omitted in the side view).

The manipulation detection device 100 captures an image of the wall surface 201 through the image sensor 101 and detects the contact position of the electronic pen 120 or the finger 300 in a region 202 in which imaging can be performed. In FIG. 2(a), if the user 200 causes the electronic pen 120 to touch the wall surface 201, the pen tip emits light. In other words, the contact position of the electronic pen 120 is obtained from a light emitting position of the electronic pen 120 in the captured image. In FIG. 2(b), the two illuminators 102 and 103 are alternately lighted up, two shadows of the finger 300 are formed, and the contact position of the finger 300 is obtained from the position relation thereof.

FIG. 3 is a diagram illustrating a relation between brightness of a captured image and manipulation detection accuracy. (1) on the left side illustrates a case in which the captured image is bright, and (2) on the right side illustrates a case in which the captured image is dark. Further, (a) on the upper side illustrates a case in which a manipulation is performed by the electronic pen 120, and (b) the lower side illustrates a case in which a manipulation is performed by the finger 300.

In a case in which the electronic pen 120 is used as in (a), when the captured image is dark as in (2), the light emitting region of the electronic pen 120 is clear, but when the captured image is bright as in (1), it is difficult to distinguish the light emitting region of the electronic pen 120 from a surrounding region. On the other hand, in a case in which the finger 300 is used as in (b), when the captured image is bright as in (1), the shadow formed by the finger 300 is clear, but when the captured image is dark as in (2), it is difficult to distinguish the shadow of the finger 300 from the surrounding region. In other words, in a case in which the electronic pen 120 emitting light and the finger 300 not emitting light are imaged under the same imaging condition, the contrast of one object image can be satisfied, whereas the contrast of the other object image decreases, and the detection accuracy of the contact position deteriorates.

In the present embodiment, when the contact position is detected from the light emitting region of the electronic pen and the shadow of the finger, the first image signal processing unit 111 and the second image signal processing unit 112 are installed in the manipulation detection device 100, and image processing is performed so that both the contrast of the first manipulation object (the electronic pen) and the contrast of the second manipulation object (the finger or the hand) are satisfied with respect to the captured image acquired by the image sensor 101. A case in which luminance gain adjustment is performed as image processing will be described as an example.

FIG. 4 is a diagram for describing luminance adjustment and contrast change by the first and second image signal processing units. FIG. 4(a) illustrates luminance adjustment by the first image signal processing unit 111, and FIG. 4(b) illustrates luminance adjustment by the second image signal processing unit 112. On the right side of FIG. 4, a change in a luminance value in the vicinity of each manipulation object (the finger 300 and the electronic pen 120) is illustrated, and a broken line indicates a change in a luminance value before adjustment, and a solid line indicates a change in a luminance value after adjustment.

In FIG. 4(a), the first image signal processing unit 111 adjusts a luminance gain G1 so that the entire image becomes dark with respect to the captured image acquired by the image sensor 101. As a result, the contrast of the light emitting unit of the electronic pen 120 can be improved. In other words, the luminance around the electronic pen 120 decreases, and a luminance difference (contrast) between the light emission center and the surrounding region increases.

In FIG. 4(b), the second image signal processing unit 112 adjusts a luminance gain G2 so that the entire image becomes brighter with respect to the image processed by the first image signal processing unit 111. As a result, the luminance around the finger 300 increases, a luminance difference between the shadow of the finger 300 and the surrounding region increases, and thus the contrast can be improved.

With the luminance adjustment in FIG. 4(a), the luminance decreases even in the region around the finger 300 which is the other manipulation object, and the luminance difference between the shadow of the finger 300 and the surrounding region decreases. Here, the adjustment gain G1 is decided so that the luminance difference does not disappear, that is, the luminance of the shadow does not assimilate with the luminance of the surrounding region. This is because if the luminance difference disappears, the luminance difference (contrast) of the shadow of the finger 300 is unable to be restored in luminance adjustment of (b).

Adjustment amounts (gains G1 and G2) in the first image signal processing unit 111 and the second image signal processing unit 112 are preferably decided using an image captured once before adjustment. Further, in a case in which manipulation regions of the finger 300 and the electronic pen 120 are separated in advance in the manipulation surface, different gain values may be set in the respective manipulation regions for the gain adjustment in the first and second image signal processing units.

An image processing function performed by the first image signal processing unit 111 at a preceding stage may be implemented, for example, by a method of transmitting a control signal from the control unit 109 to the image sensor 101 and adjusting an exposure time.

With this configuration, in a case in which a manipulation input is performed using the first manipulation object (the electronic pen) emitting light and the second manipulation object (the finger or the hand) not emitting light, it is possible to implement the image contrast suitable for each detection and detect the manipulation object. Since the image contrast in each detection process is improved, the detection accuracy for the contact point is improved, and the manipulation performance is improved.

The manipulation detection method of each manipulation object will be described below. First, a manipulation detection technique using the electronic pen 120 (the first manipulation object) will be described.

Figure 5:
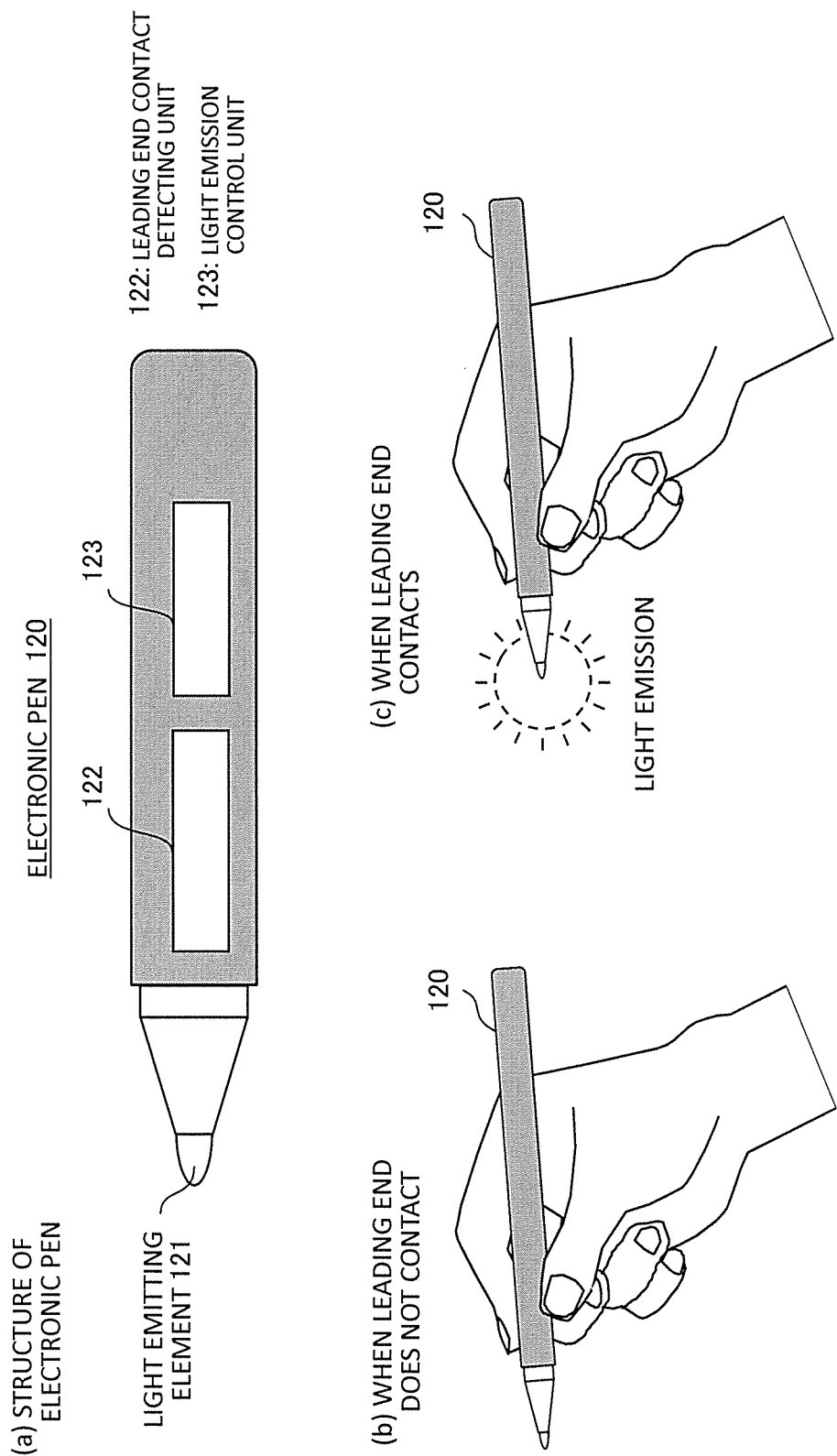
FIG. 5 is a diagram illustrating an example of a configuration and an operation of an electronic pen.

FIG. 5 is a diagram illustrating an example of a configuration and an operation of the electronic pen. FIG. 5(a) illustrates a structure of the electronic pen 120 and includes a light emitting element 121, a leading end contact detecting unit 122, and a light emission control unit 123. The leading end contact detecting unit 122 is constituted by hardware, a pressure sensor, or the like, and determines whether or not the leading end of the electronic pen 120 comes into contact with the wall surface or the like. The leading end contact detecting unit 122 may be constituted using different sensors in order to obtain a similar result. The light emission control unit 123 is constituted by hardware, software, or the like, and controls the light emission of the light emitting element 121 on the basis of a determination result of the leading end contact detecting unit 122.

FIG. 5(b) illustrates a case in which the leading end of the electronic pen 120 does not come into contact with it, and control is performed such that the light emitting element 121 is lighted off. FIG. 5(c) illustrates a case in which the leading end of the electronic pen 120 comes into contact with it, and control is performed such that the light emitting element 121 is lighted up. In a case in which the leading end of the electronic pen 120 does not come into contact with it in 5(b), control may be performed such that the light emitting element 121 blinks. Alternatively, control may be performed such that at the time of contact, the light emitting element 121 blinks at a different frequency from a frequency at the time of non-contact. In any case, control may be performed such that the light emitting state of the light emitting element 121 at the time of contact differs from that at the time of non-contact.

The image sensor 101 may be constituted by an infrared camera, and the light emitting element 121 may be constituted by an infrared illuminator, and a process of imaging an infrared image and detecting the contact position of the pen (which will be described later) may be performed. Further, in a case in which the image sensor 101 and the light emitting element 121 are constituted by the infrared camera and the infrared illuminator, respectively, a filter may be added to the configuration of the infrared camera so that imaging is performed in a state in which a part or all of light which is not in an infrared region is blocked.

Figure 6:
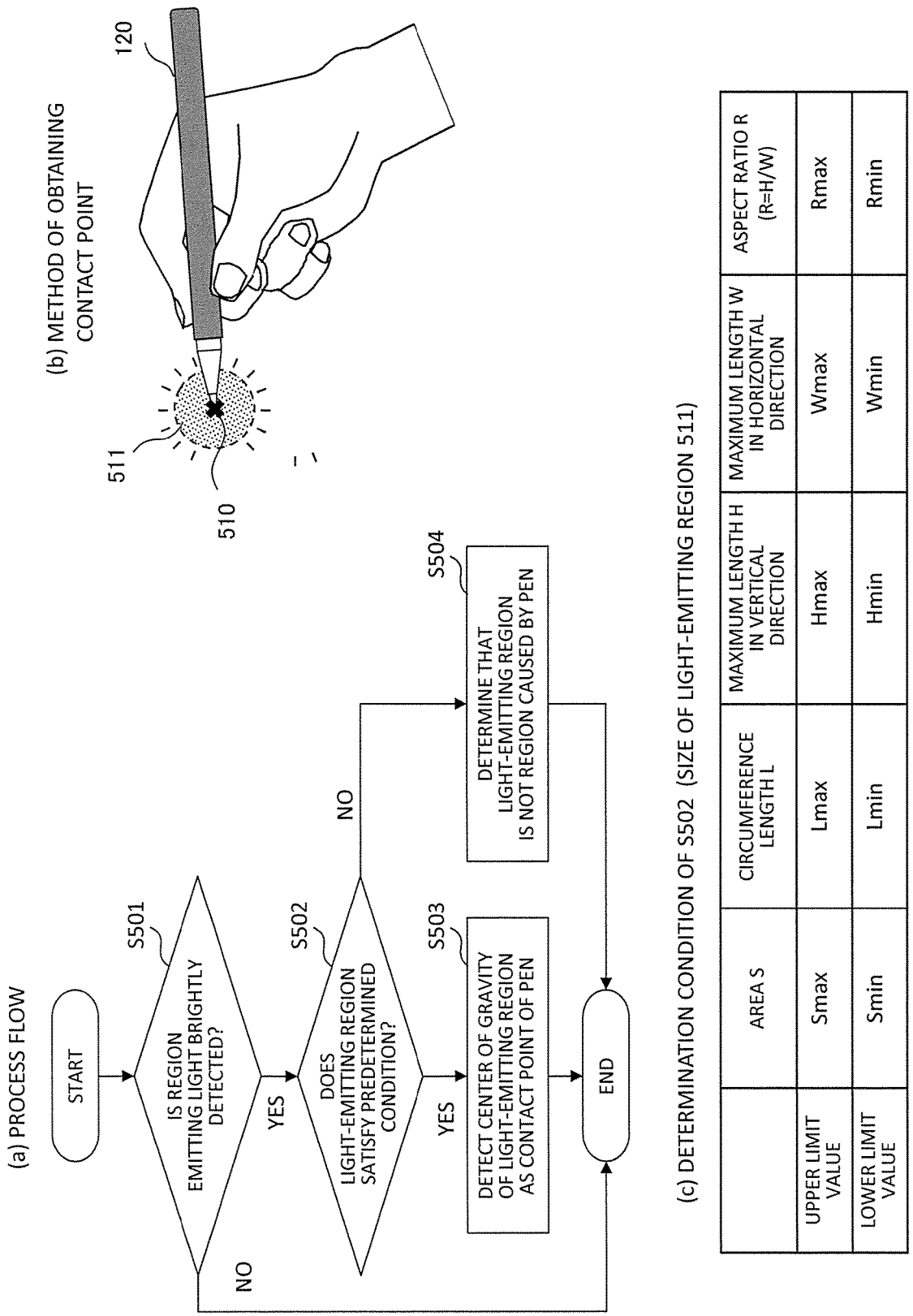
FIG. 6 is a diagram for describing detection of a contact position between an electronic pen and a wall surface.

FIG. 6 is a diagram for describing the detection of the contact position between the electronic pen and the wall surface. The pen tip contact point detecting unit 115 performs a process of detecting the contact point between the electronic pen 120 and the wall surface 201. FIG. 6(a) illustrates a processing flow, and FIGS. 6(b) and 6(c) are diagrams for describing a method of obtaining the contact point.

In S501, the pen tip extracting unit 114 determines whether or not a region emitting light brightly is detected in the image processed by the first image signal processing unit 111. In a case in which the region emitting light brightly is detected, the process proceeds to S502, and in a case in which the region emitting light brightly is not detected, a series of flows ends.

In S502, the pen tip contact point detecting unit 115 determines whether or not a detected light emitting region 511 satisfies a predetermined condition. FIG. 6(b) illustrates a state in which the pen tip of the electronic pen 120 emits light (the light emitting region 511), and FIG. 6(c) illustrates a determination condition of the light emitting region 511. The pen tip contact point detecting unit 115 determines whether or not an area S, a circumference length L, a maximum length H in a vertical direction, a maximum length W in a horizontal direction, an aspect ratio R, and the like of the light emitting region 511 fall between an upper limit value and a lower limit value. This condition is set so that the light emitting region is caused only by the light emission of the electronic pen 120. In a case in which the condition is satisfied as a result of determination, the processing proceeds to S503, and in a case in which the condition is not satisfied, the processing proceeds to S504.

In S503, as illustrated in FIG. 6(b), the center of gravity 510 of the light emitting region 511 is detected as the contact point of the pen tip. Alternatively, the position of the center of gravity of a group of points on the circumference of the light emitting region 511 may be detected as the contact point of the pen tip.

In S504, it is determined that the light emitting region is not a region caused by the electronic pen 120. In a case in which the process of S503 or S504 ends, a series of flows ends.

Here, a flow of one cycle in which the process of S501 to S504 is executed once is illustrated, but in practice, it returns to S501 after S503 and S504, and this flow is repeated.

In the present embodiment, since the luminance difference (contrast) between the light emitting region 511 and the surrounding region is sufficiently obtained as a result of luminance adjustment by the first image signal processing unit 111, determination errors in S501 and S502 are reduced, and in S503, it is possible to detect the position of the contact point with a high degree of accuracy. The process of the pen tip contact point detecting unit 115 may be performed using other image processing algorithms for obtaining a similar result.

Figure 9:
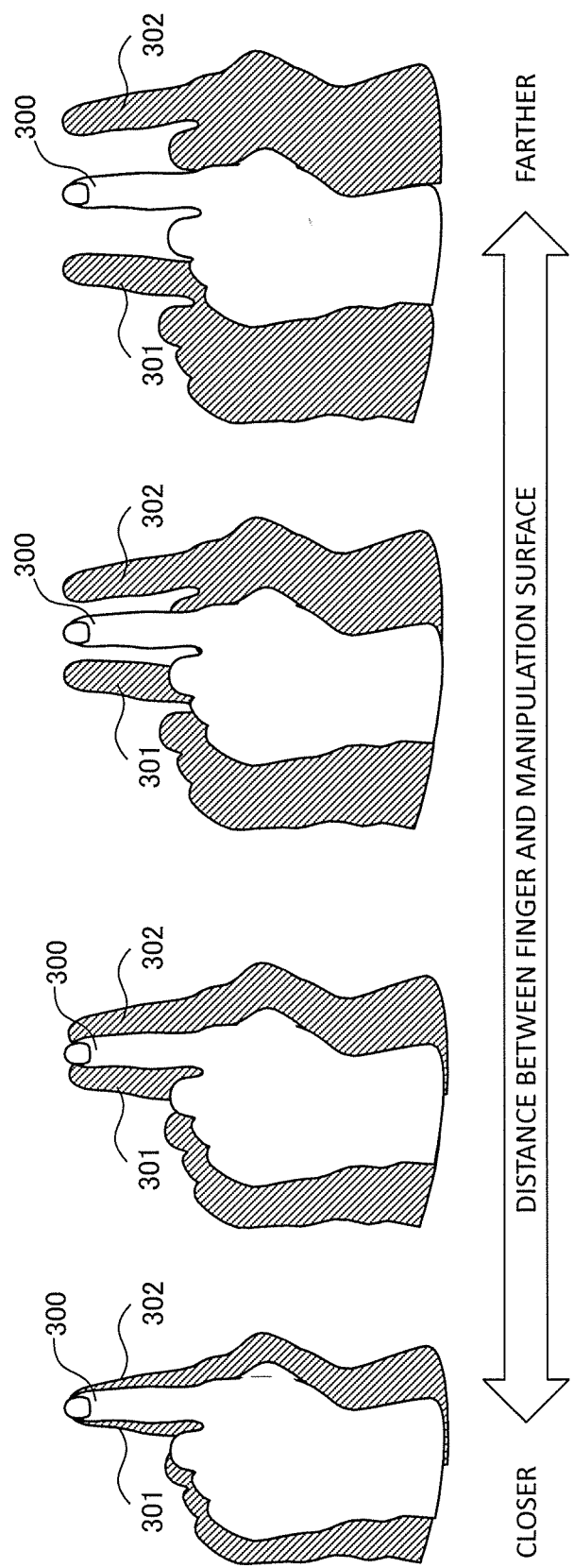
FIG. 9 is a diagram illustrating an approach degree of a finger and a generation position of a shadow together.

Next, a manipulation detection technique using the finger or the hand (the second manipulation object) will be described. FIGS. 7 to 9 are diagrams illustrating examples of a difference in a shape of the shadow according to the presence or absence of contact between the finger 300 and the wall surface 201 in a case in which the illuminator 102 or the illuminator 103 is lighted up.

FIG. 7(a) illustrates a shape of a shadow in a case in which the finger 300 does not touch the wall surface 201. In a case in which the illuminator 103 is lighted up, a shadow 301 is formed by the illuminator 103, and in a case in which the illuminator 102 is lighted up, a shadow 302 is formed by the illuminator 102. The shadow 301 and the shadow 302 are separated from each other. FIG. 7(b) illustrates a principle of forming the shadow illustrated in FIG. 7(a). In a case in which viewed from the upper side of the projection surface, the light radiated by the illuminator 103 is blocked by the finger 300, and the shadow 301 is formed on the wall surface 201. Further, the light radiated by the illuminator 102 is blocked by the finger 300, and the shadow 302 is formed on the wall surface 201. Therefore, in the image captured by the image sensor 101, the shadow 301 and the shadow 302 are separated from each other.

On the other hand, FIG. 8(a) illustrates shadows in a case in which the finger 300 touches the wall surface 201. A shadow 301 and a shadow 302 are close to each other at a position of the fingertip of the finger 300. FIG. 8(b) illustrates a principle of forming the shadows illustrated in FIG. 8(a). In a case in which viewed from the upper side of the projection surface, the light radiated by the illuminator 103 is blocked by the finger 300, and the shadow 301 is formed on the wall surface 201. Further, the light radiated by the illuminator 102 is blocked by the finger 300, and the shadow 302 is formed on the wall surface 201. Therefore, in the image captured by the image sensor 101, the shadow 301 and the shadow 302 are close to each other at the position of the fingertip.

FIG. 9 is a diagram illustrating an approach degree of the finger and generation positions of the shadows 301 and 302 together. In the case in which the distance between the finger 300 and the wall surface 201 is shortest (at the time of contact), the shadow 301 and the shadow 302 are close to each other at the position of the fingertip. As the finger 300 and the wall surface 201 are separated, the distance between the shadow 301 and the shadow 302 gradually increases. Further, in a case in which the distance between the finger 300 and the wall surface 201 is large, the shadow 301 and the shadow 302 are separated from the finger 300. As described above, the distance between the shadow 301 and the shadow 302 corresponds to the distance (approach degree of finger) between the finger 300 and the wall surface 201.

Figure 10:
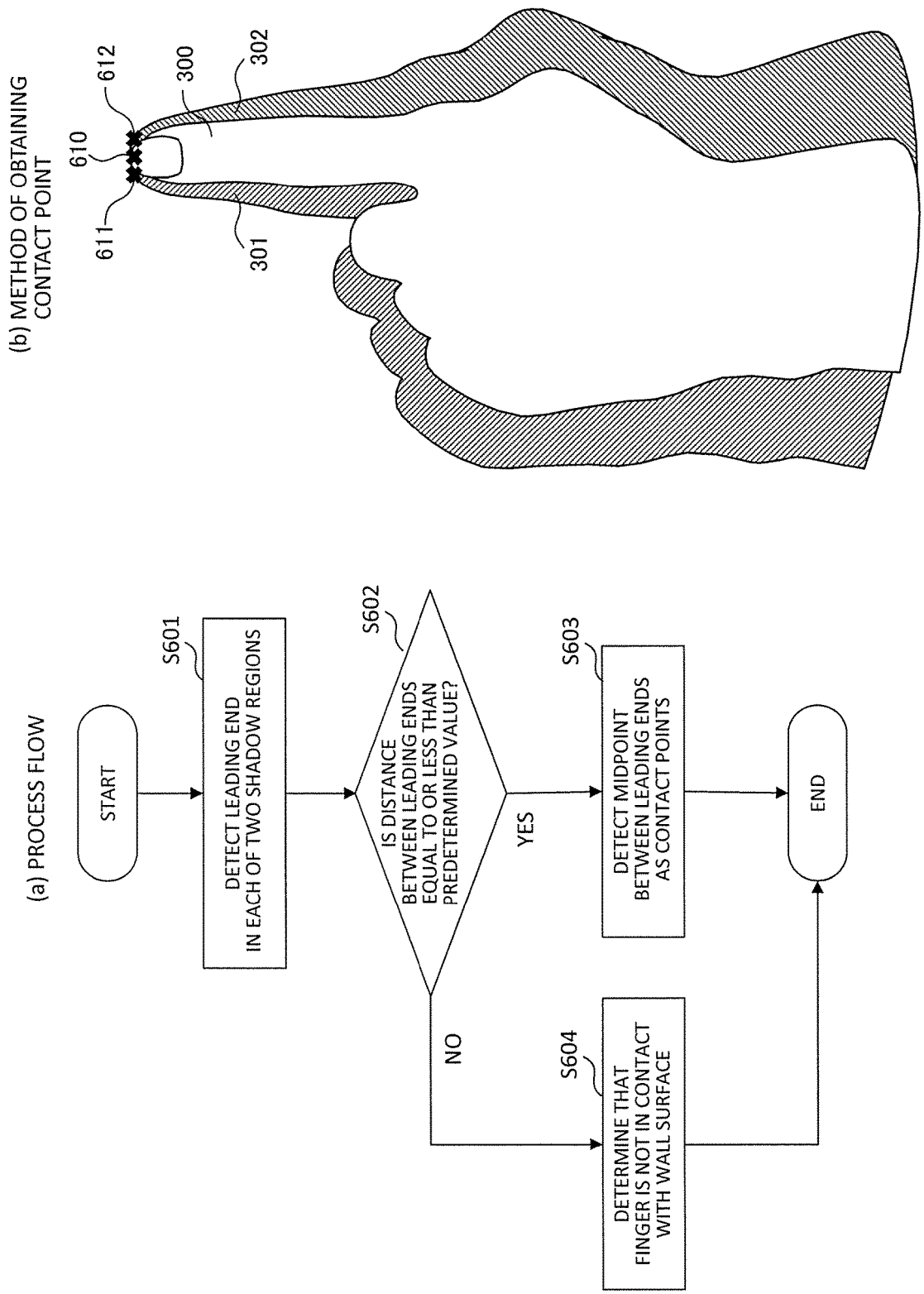
FIG. 10 is a diagram for describing detection of a contact position between a finger and a wall surface.

FIG. 10 is a diagram for describing the detection of the contact position between the finger and the wall surface. The fingertip contact point detecting unit 108 performs a process of detecting the contact point between the finger 300 and the wall surface 201. FIG. 10(a) illustrates the processing flow, and FIG. 10(b) is a diagram for describing how to obtain the contact point.

In S601, the contour detecting unit 107 detects the leading end 611, 612 of the shadow 301, 302 of the finger 300. In step S602, the fingertip contact point detecting unit 108 calculates a distance between a leading end 611 and a leading end 612, and determines whether or not the distance is equal to or less than a predetermined value (a given value). In a case in which the distance is equal to or less than the predetermined value, the process proceeds to S603, and in a case in which the distance is larger than the predetermined value, the process proceeds to S604.

In step S603, the finger 300 is determined to touch the wall surface 201, and a midpoint 610 between the leading end 611 and the leading end 612 is detected as the contact point between the finger 300 and the wall surface 201 as illustrated in FIG. 10(b).

In step S604, the finger 300 is determined not to touch the wall surface 201. If the process of S603 or S604 ends, a series of flows ends.

Here, a flow of one cycle in which the process of S601 to S604 is executed once is illustrated, but in practice, the process returns to S601 after S603 and S604, and this flow is repeated.

In the present embodiment, since the luminance difference (contrast) between the two shadows 301 and 302 and the surrounding region is sufficiently obtained as a result of luminance adjustment by the second image signal processing unit 112, detection/determination errors in S601 and S602 are reduced, and in S603, it is possible to detect the position of the contact point with a high degree of accuracy.

As described above, according to the first embodiment, in a case in which the first manipulation object emitting light and the second manipulation object not emitting light are imaged and detected using one image sensor, it is possible to implement the contrast suitable for detection of each manipulation object in each detection process. There is an effect in that as the contrast of the manipulation object is improved, the contact point detection accuracy is improved, and the manipulation performance is improved. Further, there is an effect in that the manipulation detection device of the present embodiment can be used for any manipulation object and any manipulation surface such as the wall surface or the table.

In the configuration of the manipulation detection device 100 illustrated in FIG. 1, the respective units denoted by reference numerals 101 to 115 are independent but may be configured with one or more components if necessary. For example, 105 to 115 may be configured to perform a process through one or more central processing units (CPU). In FIG. 1, all the units 101 to 110 are installed inside the manipulation detection device 100, but one or more units may be installed outside the manipulation detection device 100 and connected to the manipulation detection device 100 via a network connection, a universal serial bus (USB) connection, or a wired or wireless connection.

Figure 11:
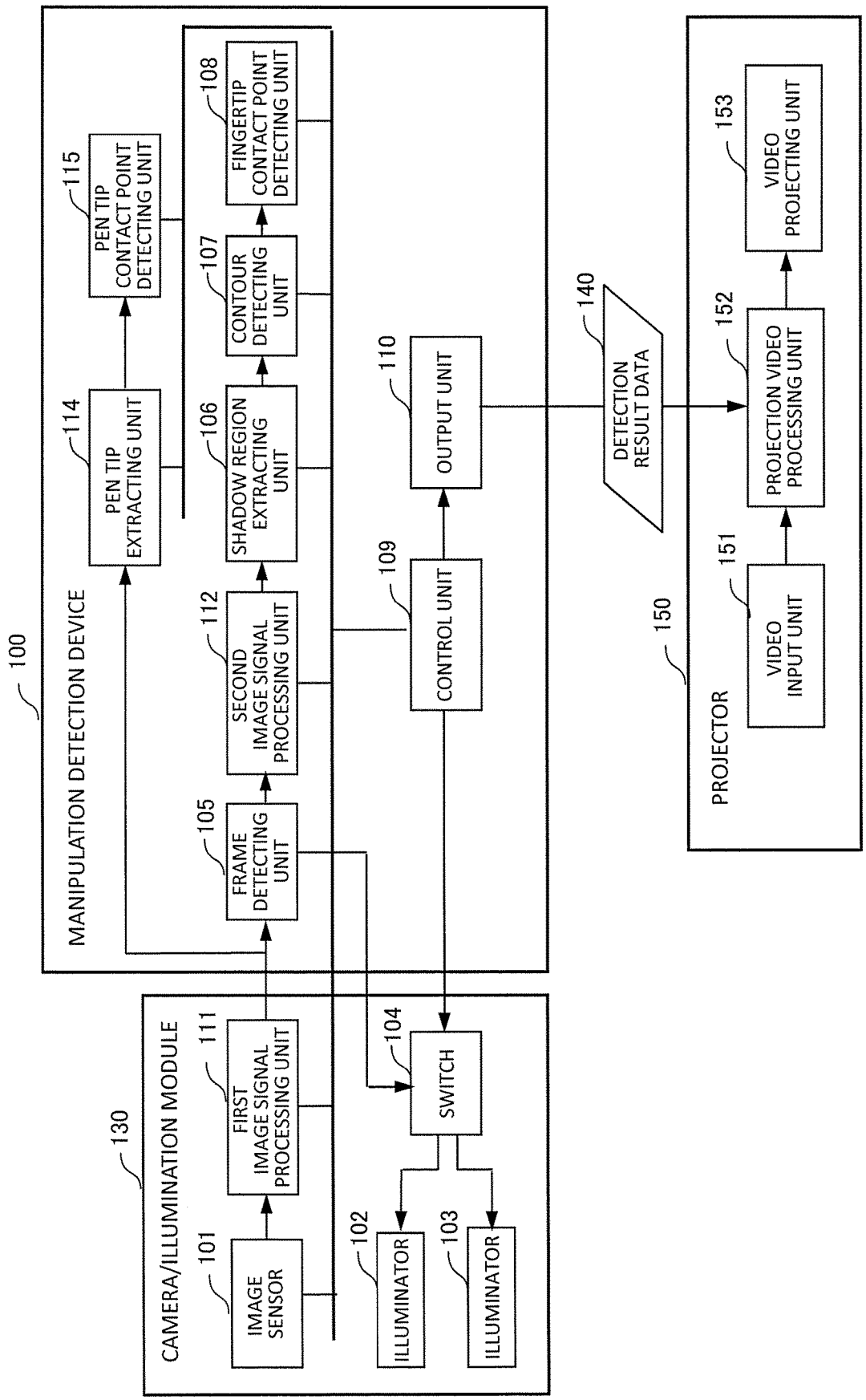
FIG. 11 is a configuration diagram illustrating a modified example of FIG. 1.

For example, FIG. 11 is a block diagram illustrating a modified example of FIG. 1. In FIG. 11, the image sensor 101, the first image signal processing unit 111, the illuminators 102 and 103, and the switch 104 are configured as a camera/illuminator module 130 different from the manipulation detection device 100. Further, the manipulation detection device 100 and the module 130 are connected via a USB or the like.

Second Embodiment

In the second embodiment, the second image signal processing unit in the first embodiment is removed, and a third image signal processing unit is arranged at a stage preceding the pen tip extracting unit 114.

Figure 12:
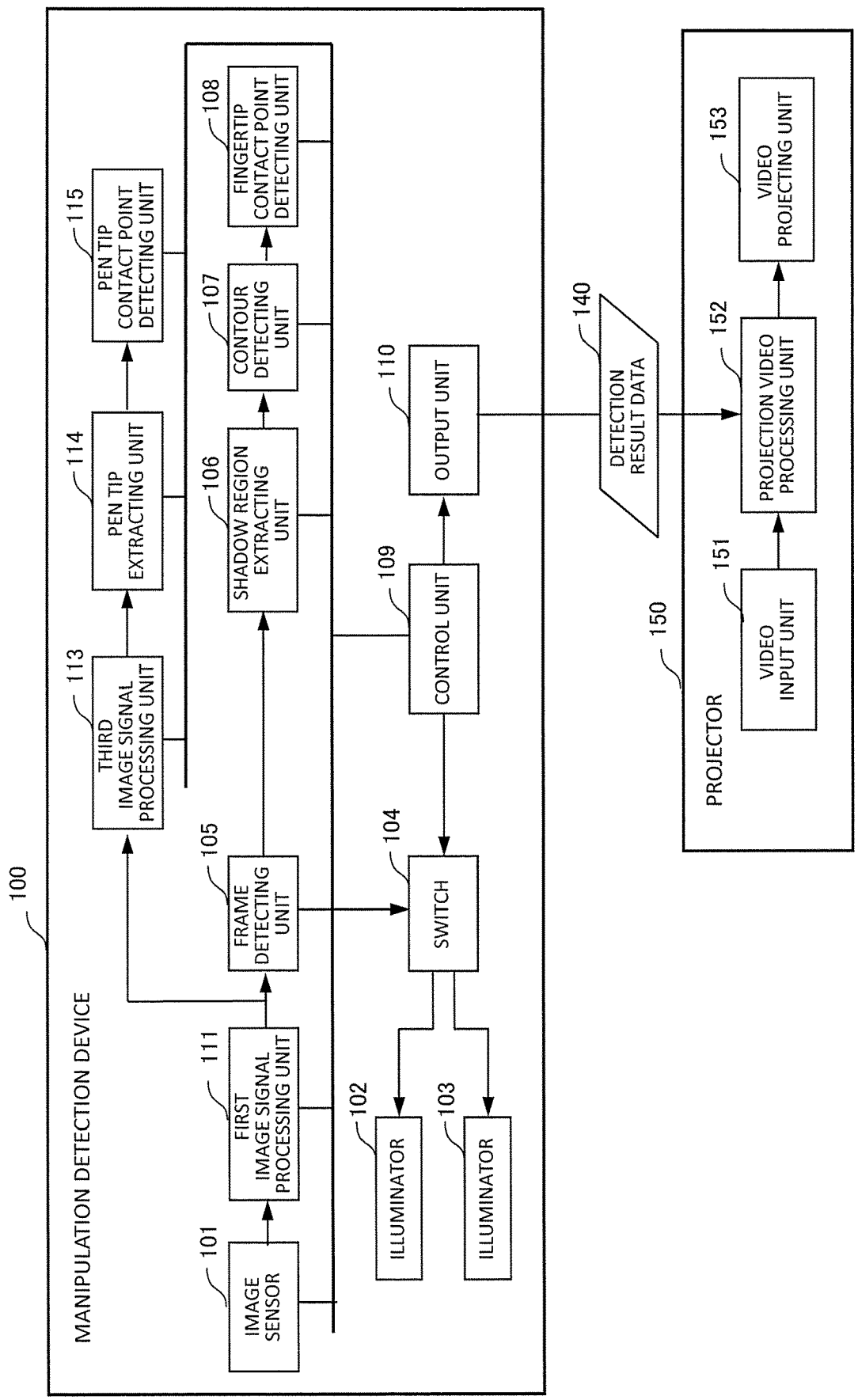
FIG. 12 is a configuration diagram of a video display system using a manipulation detection device in a second embodiment.

FIG. 12 is a diagram illustrating a configuration of a video display system using a manipulation detection device in the second embodiment. A difference from the first embodiment (FIG. 1) lies in that the second image signal processing unit 112 arranged at a stage preceding the shadow region extracting unit 106 is removed, and instead, a third image signal processing unit 113 is added to a stage preceding the pen tip extracting unit 114.

In this configuration, in order to facilitate the shadow region extraction process in the shadow region extracting unit 106, the first image signal processing unit 111 at the preceding stage performs image processing so that the entire image becomes bright. On the other hand, in order to facilitate the pen tip extraction process in the pen tip extracting unit 114, the third image signal processing unit 113 at a subsequent stage performs image processing on the image processed by the first image signal processing unit 111 so that the entire image becomes dark. In other words, referring to FIG. 4 of the first embodiment, an adjustment corresponding to the gain adjustment G2 in FIG. 4(b) is performed in the first image signal processing unit 111, and an adjustment corresponding to the gain adjustment G1 of FIG. 4(a) is performed in the third image signal processing unit 113.

With the luminance adjustment by the first image signal processing unit 111, the luminance difference between the light emitting portion of the electronic pen 120 and the surrounding region decreases, but the adjustment gain is decided so that the luminance difference does not disappear, that is, the luminance of the light emitting portion does not assimilate with the luminance of the surrounding region. This is because if the luminance difference disappears, the luminance difference of the light emitting portion of the electronic pen 120 is unable to be recovered in the next luminance adjustment of the third image signal processing unit 113.

In the configuration of the second embodiment, when a contact is detected from the light emission of the pen tip of the electronic pen and the shadow of the finger, the appropriate luminance adjustment is performed through the first image signal processing unit and the third image signal processing unit, and thus the image contrast optimum for each detection is implemented, and the detection accuracy of both is improved as well. In other words, a similar effect as in the first embodiment is obtained.

Any one of the configurations of the first embodiment and the second embodiment is preferably selected in accordance with a usage environment. The configuration of the first embodiment is suitable when external light is dark, and the captured image is dark or when the reflectance of the projection surface is low. This is because the luminance adjustment amount performed by the first image signal processing unit 111 at the first stage (a decrease width of the gain G1) is small, and degradation of the processed image is small. Conversely, the configuration of the second embodiment is suitable when the external light is bright, and the captured image is bright or when the reflectance of the projection surface is high. This is because the luminance adjustment amount performed by the first image signal processing unit 111 at the first stage (an increase width of the gain G2) is small, and degradation of the processed image is small.

Third Embodiment

In a third embodiment, a third image signal processing unit is further added to the stage preceding the pen tip extracting unit 114 in the configuration of the first embodiment. In other words, three image signal processing units are installed.

Figure 13:
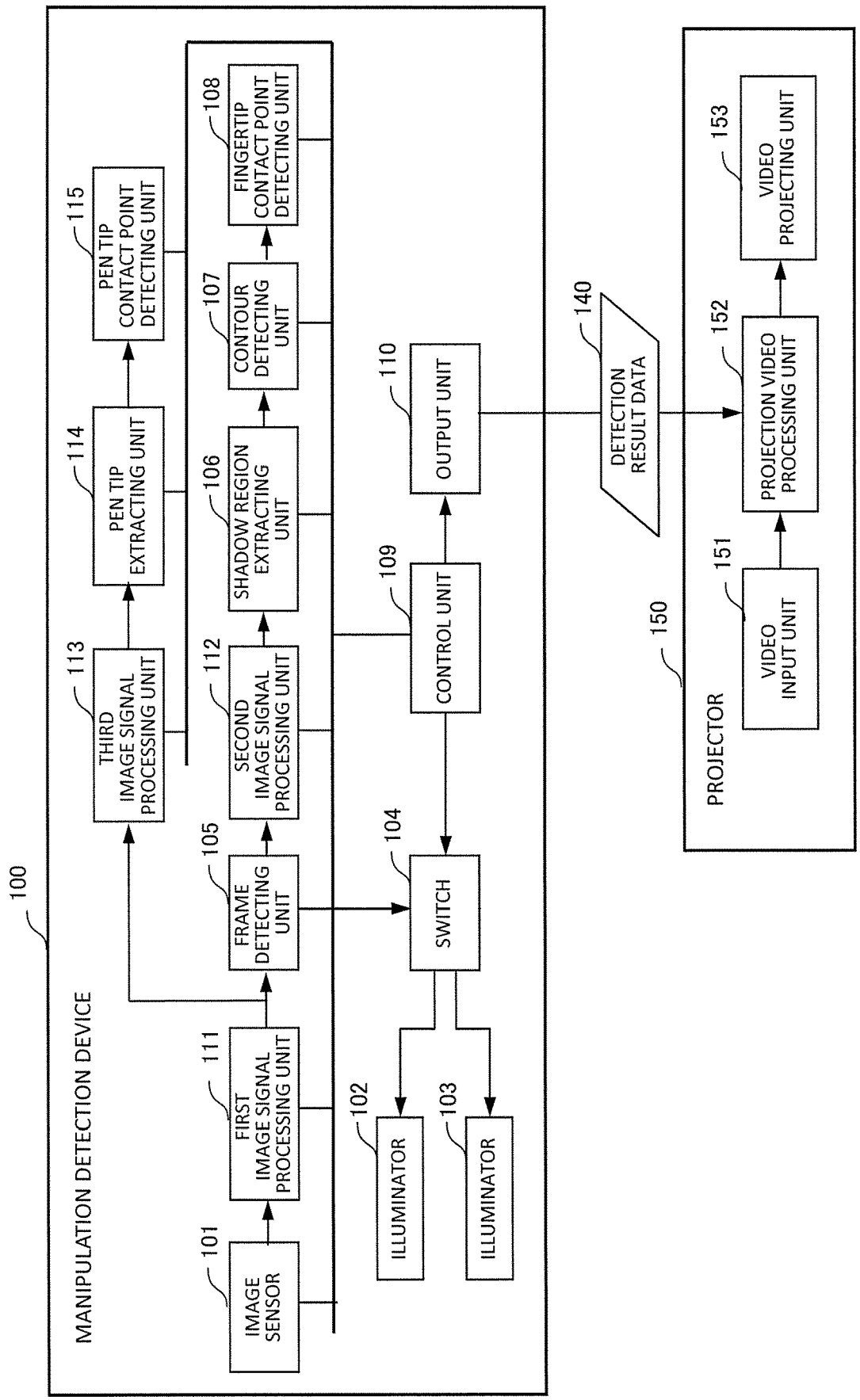
FIG. 13 is a configuration diagram of a video display system using a manipulation detection device in a third embodiment.
Figure 14:
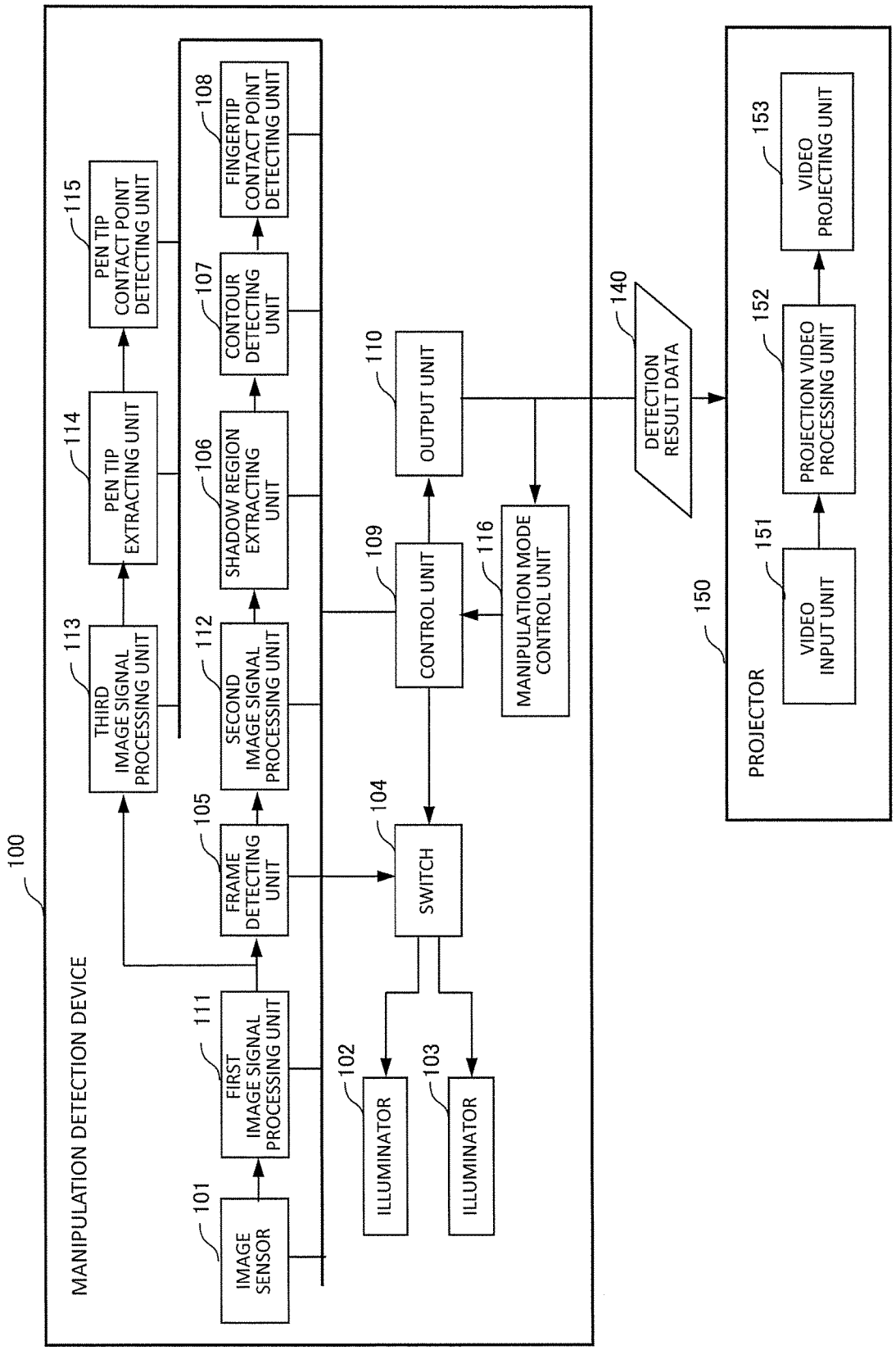
FIG. 14 is a configuration diagram of a video display system using a manipulation detection device in a fourth embodiment.

FIG. 13 is a diagram illustrating a configuration of a video display system using a manipulation detection device in the third embodiment. A difference from the first embodiment (FIG. 1) lies in that the third image signal processing unit 113 is arranged to the stage preceding the pen tip extracting unit 114.

In this configuration, in order to facilitate the shadow region extraction process in the first image signal processing unit 111 at the preceding stage, image processing (pre-processing) is performed so that the entire image becomes slightly brighter. In the second image signal processing unit 112 at the subsequent stage, in order to facilitate the shadow region extraction process in the shadow region extracting unit 106, image processing is performed on the image processed by the first image signal processing unit 111 so that the entire image becomes brighter. On the other hand, in the third image signal processing unit 113 at the subsequent stage, in order to facilitate the pen tip extraction process in the pen tip extracting unit 114, image processing is performed on the image processed by the first image signal processing unit 111 so that the entire image becomes dark.

In other words, referring to FIG. 4 of the first embodiment, an adjustment corresponding to the gain adjustment G2 in FIG. 4(b) is performed in the second image signal processing unit 112 at the subsequent stage, and an adjustment corresponding to the gain adjustment G1 of FIG. 4(a) is performed in the third image signal processing unit 113. In a case in which the input captured image is bright, the first image signal processing unit 111 at the preceding stage may perform image processing (pre-processing) so that the image becomes slightly darker.

In the configuration of the third embodiment, when a contact is detected from the light emission of the pen tip of the electronic pen and the shadow of the finger, the appropriate luminance adjustment is performed through the second image signal processing unit and the third image signal processing unit, and thus the image contrast optimum for each detection is implemented, and the detection accuracy of both is improved as well.

Since both of the processes in the second image signal processing unit and the third image signal processing unit in the third embodiment are the final processes, there is no restriction on the gain adjustment, and as compared with the first and second embodiments, a more ideal image contrast can be obtained. In other words, since the second image signal processing unit can be specialized for the shadow region extraction process, the luminance of the light emitting portion may be assimilated with the surrounding region in another pen tip extraction process. Further, since the third image signal processing unit can be specialized for the pen tip extraction process, the luminance of the shadow may be assimilated with the surrounding region in another shadow region extraction process.

Fourth Embodiment

A fourth embodiment is related to a configuration in which a manipulation mode can be switched in the manipulation detection device of the third embodiment. In other words, it is possible to perform switching among a mode in which a manipulation is performed using only the electronic pen (the first manipulation object), a mode in which a manipulation is performed only the finger (the second manipulation object), and a mode in which a manipulation is performed using both the electronic pen and the finger.

g. 14 is a diagram illustrating a configuration of a video display system using a manipulation detection device in the fourth embodiment. A difference from the third embodiment (FIG. 13) lies in that a manipulation mode control unit 116 is newly added. The manipulation mode control unit 116 decides a current manipulation mode on the basis of the detection result data 140 (the contact point information of the electronic pen and the fingertip) output from the output unit 110 or user input from the outside. In this example, a first manipulation mode for detecting a manipulation performed only by the electronic pen, a second manipulation mode for detecting a manipulation performed only by the finger, a third manipulation mode for detecting a manipulation performed by both the electronic pen and the finger are set as a manipulation mode.

The manipulation mode control unit 116 transmits a mode switching signal to the control unit 109 in accordance with the decided current manipulation mode. The control unit 109 performs control in accordance with the mode switching signal such that the first image signal processing unit 111, the second image signal processing unit 112, and the third image signal processing unit 113 perform image processing corresponding to the manipulation mode. In other words, the gain adjustment state is switched and set in each the first to third image signal processing units.

Figure 15:
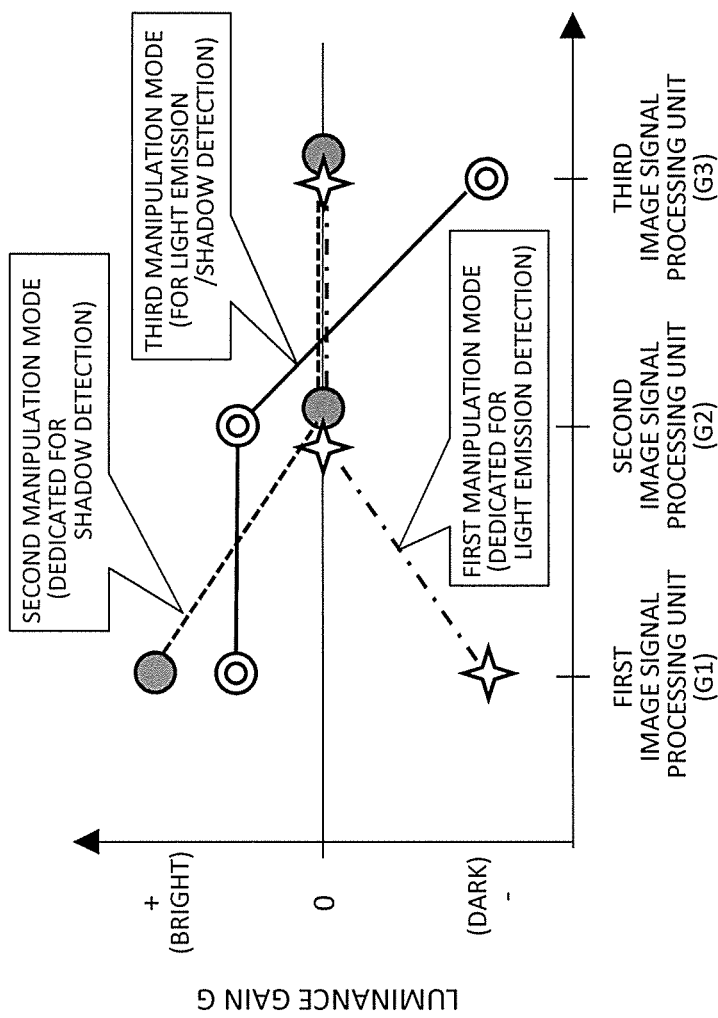
FIG. 15 is a diagram illustrating an example of a gain adjustment state in each manipulation mode.

FIG. 15 is a diagram illustrating an example of a gain adjustment state in each manipulation mode. In a first manipulation mode in which only the light emission by the electronic pen is detected, the first image signal processing unit performs an adjustment so that the image becomes darker (the gain G1 is negative (−)), and the second and third second image signal processing units do not perform an adjustment (the gains G2 and G3=0). In a second manipulation mode in which only the shadow by the finger is detected, the first image signal processing unit performs an adjustment so that the image becomes bright (the gain G1 is positive (+)), and the second and third second image signal processing units do not perform an adjustment (the gains G2 and G3=0). In a third manipulation mode in which both the light emission of the electronic pen and the shadow of the finger are detected, the first and second image signal processing units perform an adjustment so that the image becomes bright (the gains G1 and G2 are positive (+)), and the third second image signal processing unit does not perform an adjustment (the gain G3=0). As described above, the gain adjustment state of each of the first to third image signal processing units differ depending on each manipulation mode.

According to the fourth embodiment, when a contact is detected from the light emission of the pen tip of the electronic pen and the shadow of the finger, the gain adjustment states of the first to third image signal processing units are switched, the operations thereof are performed, and thus the image contrast optimum for each detection can be implemented. Accordingly, the detection accuracy for the contact point in each detection process is improved, and the manipulation performance is improved.

In each of the above embodiments, in order to facilitate understanding of the present invention, the configurations of the device and the system have been described in detail and specifically, and the present invention is not necessarily limited to those having all the components described above. For example, it is possible to replace a part of a configuration of a certain embodiment with a configuration of another embodiment, and it is also possible to add a configuration of another embodiment to a configuration of a certain embodiment.

The image signal processing unit in each embodiment has been described as adjusting the luminance gain for the image signal, but all of methods capable of adjusting the contrast including the gamma adjustment can be applied. Among them, the image signal processing unit at the first stage may control the exposure time in the image sensor 101 such that the contrast is adjusted.

REFERENCE SIGNS LIST

100 manipulation detection device
101 image sensor (imaging unit)
102, 103 illuminator
104 switch
105 frame detecting unit
106 shadow region extracting unit
107 contour detecting unit
108 fingertip contact point detecting unit
109 control unit
110 output unit
111 first image signal processing unit
112 second image signal processing unit
113 third image signal processing unit
114 pen tip extracting unit
115 pen tip contact point detecting unit
116 manipulation mode control unit
120 electronic pen (first manipulation object)
121 light emitting element
130 module
140 detection result data
150 projector
151 video input unit
152 projection video processing unit
153 video projecting unit
200 user
201 wall surface
202 imaging range
300 finger (second manipulation object)
301, 302 shadow
510, 610 contact point

The invention claimed is:

1. A video display system that controls a video to be projected by a projector on the basis of a manipulation of a user detected by a manipulation detection device that performs a first manipulation detection process based on detection of light emission or reflected light of a first manipulation object and a second manipulation detection process based on detection of a shadow of a second manipulation object by radiation of illumination light, wherein the manipulation detection device comprises:
an imaging unit that captures an image of the first manipulation object and an image of the second manipulation object;
an image signal processing unit that performs a contrast adjustment of a captured image captured by the imaging unit; and
a manipulation detecting unit that executes the first manipulation detection process and the second manipulation detection process using a captured image which has undergone the contrast adjustment, and wherein the projector comprises:
a projection video processing unit that processes a video signal to be projected; and a video projecting unit that converts the video signal into projection video light and projecting the projection video light onto a projection surface, wherein a state of the contrast adjustment performed by the image signal processing unit differs between a captured image used in the first manipulation detection process and a captured image used in the second manipulation detection process, wherein the manipulation detection device transmits detection result data obtained by the manipulation detecting unit to the projector, and wherein the projection video processing unit performs switching of a video to be projected from the video projecting unit or a display format change on the basis of the received detection result data.

2. The video display system according to claim 1, wherein the manipulation detection device comprises at least one processor programmed to perform switching among a plurality of manipulation detection modes, the manipulation detection modes comprises a first manipulation mode in which the first manipulation detection process is executed, and the second manipulation detection process is not executed, a second manipulation detection mode in which the first manipulation detection process is not executed, and the second manipulation detection process is executed, and a third manipulation mode in which both the first manipulation detection process and the second manipulation detection process are executed, and the processor sets three different contrast adjustment states in the image signal processing unit in accordance with the first manipulation mode, the second manipulation mode, and the third manipulation mode.

3. A manipulation detection device that performs a first manipulation detection process based on detection of light emission or reflected light of a first manipulation object and a second manipulation detection process based on detection of a shadow of a second manipulation object by radiation of illumination light, comprising:

an imaging unit that captures an image of the first manipulation object and an image of the second manipulation object;

an image signal processing unit that performs a contrast adjustment when imaging is performed by the imaging unit;

a manipulation detecting unit that executes the first manipulation detection process and the second manipulation detection process using a captured image which has undergone the contrast adjustment; and at least one processor programmed to perform switching among a plurality of manipulation detection modes, wherein a state of the contrast adjustment performed by the image signal processing unit differs between a captured image used in the first manipulation detection process and a captured image used in the second manipulation detection process, wherein the manipulation detection modes include a first manipulation mode in which the first manipulation detection process is executed, and the second manipulation detection process is not executed, a second manipulation detection process in which the first manipulation detection process is not executed, and the second manipulation detection process is executed, and a third manipulation mode in which both the first manipulation detection process and the second manipulation detection process are executed, and the processor sets three different contrast adjustment states in the image signal processing unit in accordance with the first manipulation mode, the second manipulation mode, and the third manipulation mode.

4. The manipulation detection device according to claim 3, wherein the image signal processing unit includes at least two signal processing units that perform different contrast adjustments for the first manipulation detection process and the second manipulation detection process.

5. The manipulation detection device according to claim 3, wherein the contrast adjustment performed by the image signal processing unit is a gain adjustment of the captured image captured by the imaging unit.

6. The manipulation detection device according to claim 3, wherein the contrast adjustment performed by the image signal processing unit is a gamma adjustment of the captured image captured by the imaging unit.

7. The manipulation detection device according to claim 3, wherein the contrast adjustment performed by the image signal processing unit includes an exposure time adjustment when the imaging is performed by the imaging unit.

* * * * *